May 12, 1959 W. G. DIETRICH ET AL Re. 24,649

BALL PEN

Original Filed Nov. 3, 1953

INVENTORS
William G. Dietrich
James A. Shaw
BY Pennie, Edmonds, Morton, Barrows & Taylor
ATTORNEYS United States Patent Office Re. 24,649
Reissued May 12, 1959

24,649

BALL PEN

William G. Dietrich and James A. Shaw, Charlottesville, Va., assignors to Essex Corporation, Charlottesville, Va., a corporation of Virginia Original No. 2,741,226, dated April 10, 1956, Serial No. 389,955, November 3, 1953. Application for reissue April 7, 1958, Serial No. 730,036

10 Claims. (Cl. 120—42.03)

Matter enclosed in heavy brackets [ ] appears in the original patent but forms no part of this reissue specification; matter printed in italics indicates the additions made by reissue.

This invention relates to ball pens of the type in which the writing unit is retractably mounted within the barrel of the pen. This writing unit usually comprises a tubular ink reservoir terminating in a conical tip in which the ball is mounted. Various means have been devised for moving the writing unit from its retracted position within the barrel of the pen to writing position with the ball tip projecting beyond the barrel, and for latching it there. It is the object of the present invention to provide improved means, simple efficient and inexpensive, for doing this.

In attaining this object we provide the upper end of the barrel with a projecting plunger, the lower end of which is provided at one side with a laterally projecting latch and on the other side with a sloping cam surface which operatively engages the upper end of the writing unit either directly or preferably through a plug having a conical top. The upper end of the barrel is provided with a keyway or guide in which the plunger slides, and a slot below the keyway designed to receive the latch in its lowermost position. A spring normally holds the writing unit in retracted position pressing against the bottom of the plunger and pushing the upper end of it through the top of the barrel. To project the ball tip of the writing unit beyond the lower end of the barrel and into writing position, the operator presses on the plunger. As the plunger descends, the writing unit descends with it until the latch registers with the slot, whereupon the spring, acting through the writing unit, cants the plunger to one side, forcing the latch through the slot, and holding it there. To retract the writing unit, the operator releases the latch by pressing it back through the slot, whereupon the spring forces the writing unit and plunger upward into their original positions.

In the accompanying drawing we have illustrated a preferred embodiment of our invention. In these drawings, Figure 1 is a longitudinal section through the ball pen showing the writing unit in retracted position.

Figure 1:
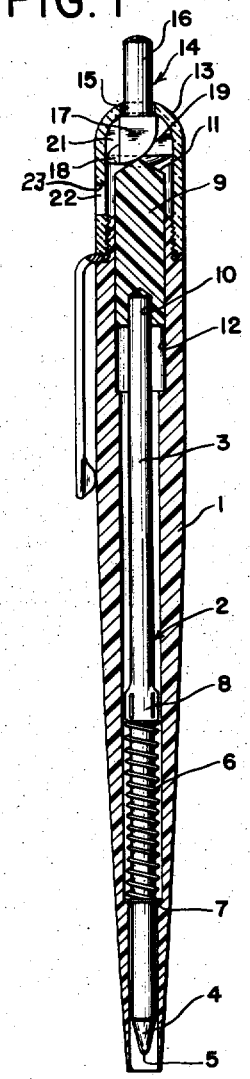
Figure 2:
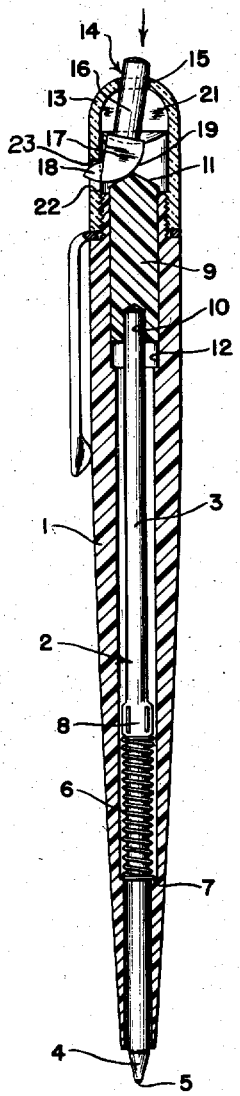
Figure 3:
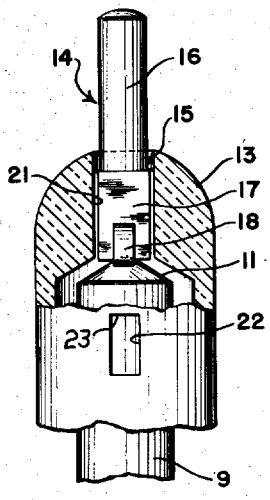
Figure 4:
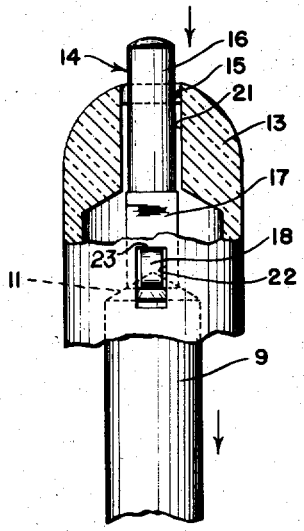

Figure 2 is a section similar to Figure 1, but showing the writing unit projected into writing position and held there by the latch, Figure 3 is an elevation on an enlarged scale, partly in section along a plane at right angles to the plane of sections 1 and 2, of the upper end of the pen showing the plunger and latch in the position of Figure 1, and Figure 4 is a view similar to Figure 3, but showing the plunger and latch in the position of Figure 2.

In these drawings 1 is the barrel of the pen, usually made of hard rubber or some suitable plastic, which houses the writing unit 2, comprising a tubular ink reservoir 3 terminating in a conical tip 4 in which the ball 5 is mounted. A coil spring 6 encircles the writing unit near its lower end and lies between an annular shoulder 7 in the bore of the barrel 1 and an enlargement 8 on the ink reservoir. As shown in Figure 1, this spring normally holds the writing unit in retracted position.

Mounted on the upper end of the writing unit is a cylindrical plug or cover 9 having a socket 10 at its lower end for loosely receiving the writing unit and having a conical tip 11 at its upper end. The plug 9 is slidingly mounted in an enlarged bore 12 in the upper end of the barrel 1.

Mounted on the upper end of the barrel, and forming a part of it, is a dome-shaped cap 13 into which the plug 9 extends. A plunger 14 overlies the conical top of the plug 9 and projects upwardly through an opening 15 at the top of the cap. This plunger comprises a cylindrical part 16, which passes through the opening 15, and a flat-sided part 17 which lies within the cap and, being larger than the opening 15, prevents the plunger from falling out. Extending laterally from the lower end of the plunger is a latch 18, while the bottom of the plunger slopes upwardly to form an arcuate cam 19. The plunger is preferably molded of plastic or die-cast metal.

As shown most clearly in Figures 3 and 4, the cap 13 is provided with a vertical keyway 21 between the walls of which the flat-sided part of the plunger lies and is guided in its vertical movement. Below this keyway the cap 13 is provided with a slot 22 which is in registry with the latch 18 in its lowermost position, as shown best in Figures 2 and 4.

When the writing unit is in its retracted position, as shown in Figure 1, the spring 6, based on the annular shoulder 7 and engaging the enlargement 8, forces the writing unit upwardly so that the conical top of the plug 9 bears against the bottom of the plunger and the tip of the latch 18 bears against the inner face of the cap. To project the writing unit downward into writing position, as shown in Figure 2, the operator presses on the cylindrical end 16 of the plunger 14, moving the plug 9 and the writing unit downward with it. As the plunger is pressed inward, the cam 19 rides along the conical top 11 of the plug 9 and it and the latch 18 are canted to one side to cause the latch 18 to enter and project through the slot 22 as shown in Fig. 2. The latch is then held against the upper wall 23 of the slot by the pressure of the spring. Thus, the upper wall 23 forms means for engaging the latch, when the plunger is moved inward, to hold the writing unit in writing position. At the same time the ball tip of the pen is projected beyond the lower end of the barrel and the pen is ready for writing. When the writer has finished using the pen and wishes to return it to his pocket he depresses the latch 18, thus freeing it from the slot 22, whereupon the spring retracts the writing unit, the parts once more assuming the position shown in Figure 1.

We claim:

1. A ball pen comprising a writing unit, a barrel housing the unit, a spring exerting a force against the unit in a direction to hold it retracted within the barrel, a cap on the upper end of the barrel, a plug on the writing unit having a conical top extending into the cap, a plunger extending through the top of the cap for moving the writing unit into writing position, a keyway in the cap in which the plunger slides, a latch on the plunger extending laterally of the barrel axis, and a cam on the bottom of the plunger engaging the conical top of the plug, the cap having a slot below the keyway in registry with the latch in its lowermost position, the plug and plunger being in alignment so that when the plunger is pushed inwardly the cam will engage the conical top of the plug and ride therealong and be canted to one side and the latch caused to enter the slot, the force of the spring at such time holding the latch against the upper wall of the slot and maintaining the writing unit in writing position.

2. A ball pen comprising a writing unit, a barrel housing the unit, a spring exerting a force against the unit in a direction to hold it retracted within the barrel, a plunger extending beyond the barrel for engaging the writing unit and moving it into writing position, a latch on the plunger extending laterally of the barrel axis, a cam on the plunger for actuating said latch, means in the barrel for engaging the latch in an inner position of the plunger to hold the writing unit in writing position, the writing unit having a surface engageable by the cam on inward movement of the plunger, said surface being inclined towards the latch-engaging means and longitudinally opposite the plunger so that when the plunger is moved inward the engagement of the cam with said surface causes the cam to ride along the inclined surface of the writing unit to move the latch member laterally and to bring it into position to be engaged by said latch-engaging means.

3. A ball pen comprising a writing unit, a barrel housing the unit, a spring exerting a force against the unit in a direction to hold it retracted within the barrel, a plunger extending beyond the barrel for engaging the writing unit and moving it into writing position, a latch on the plunger extending laterally of the barrel axis, a cam on the plunger for actuating said latch, means in the barrel for engaging the latch in an inner position of the plunger to hold the writing unit in writing position, the writing unit having a surface engageable by the cam on inward movement of the plunger, said surface being inclined towards the latch-engaging means and longitudinally opposite the plunger so that when the plunger is moved inward the engagement of the cam with said surface causes the cam to ride along the inclined surface of the writing unit and the plunger to be moved laterally and the latch to be brought into position to be engaged by said latch-engaging means.

4. A ball pen as set forth in claim 2 in which the barrel is provided with a slot to receive the latch when it is moved laterally and the latch-engaging means is a wall defining said slot.

5. A ball pen as set forth in claim 4 in which the inclined surface of the writing unit is a conical end thereof.

*6. A ball pen comprising a writing unit, a barrel housing the unit, a spring exerting a force against the unit in a direction to hold it retracted within the barrel, a plunger extending beyond the barrel for engaging the writing unit and moving it into writing position, means associated with said barrel for restraining said plunger against rotation about its longitudinal axis, a latch on the plunger extending laterally of the barrel axis, a cam on the plunger for actuating said latch, means in the barrel for engaging the latch in an inner position of the plunger to hold the writing unit in writing position, the writing unit having a surface engageable by the cam on inward movement of the plunger, said surface being inclined towards the latch-engaging means and longitudinally opposite the plunger so that when the plunger is moved inward the engagement of the cam with said surface causes the cam to ride along the inclined surface of the writing unit to move the latch member laterally and to bring it into position to be engaged by said latch-engaging means.*

*7. A ball pen as set forth in claim 6 in which the writing unit includes a tubular ink reservoir and a cap loosely mounted on the upper end of said reservoir, said cap being provided with said inclined surface.*

*8. A ball pen comprising a writing unit, a barrel housing the unit, a spring exerting a force against the unit in a direction to hold it retracted within the barrel, a plunger extending beyond the barrel for engaging the writing unit and moving it into writing position, a keyway in said barrel for maintaining said plunger against rotation about the longitudinal axis thereof, a latch on the plunger extending laterally of the barrel axis, a cam on the plunger for actuating said latch, means in the barrel for engaging the latch in an inner position of the plunger to hold the writing unit in writing position, the writing unit having a surface engageable by the cam on inward movement of the plunger, said surface being inclined towards the latch-engaging means and longitudinally opposite the plunger so that when the plunger is moved inward the engagement of the cam with said surface causes the cam to ride along the inclined surface of the writing unit and the plunger to be moved laterally and the latch to be brought into position to be engaged by said latch-engaging means.*

*9. A ball pen as set forth in claim 8 in which the barrel is provided with a slot to receive the latch when it is moved laterally and the latch-engaging means is a wall defining said slot.*

*10. A ball pen comprising a writing unit, a barrel housing the unit, a spring exerting a force against the unit in a direction to hold it retracted within the barrel, a cap on the upper end of the barrel, a plunger extending through the top of the cap for moving the writing unit into writing position, a keyway in the cap in which the plunger slides, a latch on the plunger extending laterally of the barrel axis, the cap having a slot below the keyway in registry with the latch in its lowermost position, a plug on the writing unit having a laterally inclined top surface extending into the cap and a cam on the bottom of the plunger engaging the laterally inclined surface of the top of the plug, the plug and plunger being in alignment so that when the plunger is pressed inwardly the cam will engage the inclined surface of the top of the plug and ride therealong and be canted to one side and the latch caused to enter the slot, the force of the spring at such time holding the latch against the upper wall of the slot and maintaining the writing unit in writing position.*

References Cited in the file of this patent or the original patent

UNITED STATES PATENTS

| | | |
|---|---|---|
| 378,897 | Myers | Mar. 6, 1888 |
| 2,584,569 | Frentzel | Feb. 5, 1952 |

FOREIGN PATENTS

| | | |
|---|---|---|
| 53,926 | Germany | Oct. 10, 1890 |
| 462,157 | Canada | Jan. 3, 1950 |
| 641,595 | Great Britain | Aug. 16, 1950 |
| 985,249 | France | Mar. 7, 1951 |